United States Patent
Sugano et al.

[11] Patent Number: 6,115,662
[45] Date of Patent: Sep. 5, 2000

[54] BRAKE DIAGNOSIS APPARATUS FOR SELF-PROPELLED VEHICLE

[75] Inventors: Yukio Sugano, Shiraoka-machi; Genichiro Watanabe; Nobuki Hasegawa, both of Oyama, all of Japan

[73] Assignee: Komatsu Ltd., Tokyo, Japan

[21] Appl. No.: 09/202,777

[22] PCT Filed: Jun. 26, 1997

[86] PCT No.: PCT/JP97/02213

§ 371 Date: Dec. 21, 1998

§ 102(e) Date: Dec. 21, 1998

[87] PCT Pub. No.: WO97/49591

PCT Pub. Date: Dec. 31, 1997

[30] Foreign Application Priority Data

Jun. 26, 1996 [JP] Japan .................................. 8/185473

[51] Int. Cl.[7] .................................................. G06F 15/20
[52] U.S. Cl. .............................. 701/76; 701/29; 701/70; 701/78; 701/97
[58] Field of Search .................................. 701/29, 70, 78, 701/83, 97, 76; 340/449

[56] References Cited

U.S. PATENT DOCUMENTS 4,485,444 11/1984 Maruyama et al. ....................... 701/97

FOREIGN PATENT DOCUMENTS

| 57-931 | 1/1982 | Japan . |
| 2-11454 | 1/1990 | Japan . |
| 7-96827 | 4/1995 | Japan . |

Primary Examiner—William A. Cuchlinski, Jr.
Assistant Examiner—Arthur Donnelly
Attorney, Agent, or Firm—Sidley & Austin

[57] ABSTRACT

A brake diagnosis apparatus for a self-propelled vehicle can secure the safety of the brake and the productivity of mining and quarrying and can detect widely applicable data including the history. In order to achieve this, there is provided oil temperature detecting means (23) for detecting a cooling oil temperature d immediately after the oil cools a brake; holding time calculating means, for receiving the cooling oil temperature d from the oil temperature detecting means and for calculating a holding time t thereof; and a first adding means (31a), having stored therein a first matrix A, which is sectioned in vertical and horizontal directions at every predetermined cooling oil temperature area and at every predetermined holding time area, for receiving the cooling oil temperature d from any one of the oil temperature detecting means and the holding time calculating means, for receiving the holding time t from the holding time calculating means, for adding a frequency of occurrence value An to the area of the first matrix A which includes the cooling oil temperature d and the holding time t, and for freely outputting the added value to an outer portion.

4 Claims, 2 Drawing Sheets

BRAKE DIAGNOSIS APPARATUS FOR SELF-PROPELLED VEHICLE

TECHNICAL FIELD OF THE INVENTION

The present invention relates to a brake diagnosis apparatus for a self-propelled vehicle having a hydraulic brake and a friction plate type hydraulic brake, wherein a movable friction plate attaches to and detaches from a fixed friction plate responsive to an oil pressure so as to obtain a brake force.

BACKGROUND OF THE INVENTION

As a conventional brake diagnosis apparatus for a self-propelled vehicle, there is a structure, for example, as described in Japanese Unexamined Patent Publication No. 61115739, for detecting the temperature which is generated by a brake shoe in a vehicle, for generating an alarm at a high temperature, and for controlling a traveling speed. That is, an operator receives the alarm and controls the vehicle speed, whereby a poor brake operation can be avoided.

In this case, since a traveling road, for example, in a mine for mining, quarrying, and the like, is not paved, and the vehicle for loading and carrying material frequently goes down a slope in a continuous manner, a brake is severely used. In this state, when using the apparatus, the alarm and the speed limitation are frequently performed, so that it is hard to increase the productivity of mining and quarrying although safety can be secured. Further, since the data are detected in a pin point manner at each current time, it is hard to obtain the brake performance of a vehicle as a history.

Accordingly, any application of the detected data by the apparatus is limited to a narrow range.

SUMMARY OF THE INVENTION

The present invention is made by taking the conventional problems into consideration, and an object of the present invention is to provide a brake diagnosis apparatus for a self-propelled vehicle which can detect brake data, including a history, and which can be widely applicable as well as improving the safety of the brake and the productivity of mining and quarrying.

In accordance with a first aspect of the present invention, there is provided a brake diagnosis apparatus for a self-propelled vehicle having a hydraulic brake comprising:

oil temperature detecting means for detecting a cooling oil temperature d immediately after the oil is used for cooling the brake;

holding time calculating means, for receiving the cooling oil temperature d from the oil temperature detecting means and for calculating a holding time t of the cooling oil temperature d; and a first adding means, having stored therein a first matrix A which is sectioned in vertical and horizontal directions at every predetermined cooling oil temperature area and at every predetermined holding time area, for receiving the cooling oil temperature d from any one of the oil temperature detecting means, for receiving the holding time t from the holding time calculating means, for adding a frequency of occurrence value An to the section of the first matrix A which includes the detected cooling oil temperature d and the calculated holding time t at the respective detecting time, and for freely outputting the added frequency of occurrence value to an outer portion.

In accordance with the structure mentioned above, since the detection of the brake data is not performed in a pin point manner, in the form of detection at each current point in time in accordance with the conventional art, but is based on the frequency of occurrence An, that is, the use history of the brake, the applicable range of the brake data is widened. That is, a concentration in an abnormal section and an abnormal tendency can be visually recognized in accordance with the magnitude of the frequency of occurrence An of each of the sections in the first matrix A. Whether or not the heat balance of the total vehicle is good can be judged; and various kinds of countermeasures can be taken, e.g., a clogging of the radiator can be eliminated, a shroud can be provided in the radiator, a capacity of an oil cooler and the radiator can be increased, a cooling oil amount can be increased, an incline of a downward slope can be changed, a transmission level of a transmission used in the downward slope can be decreased, a driving habit of an operator can be improved, and the like. Further, for example, a trouble in a cooling system can be recognized, and a future maintenance plan can be accurately made. Still further, even in the self-propelled vehicle which travels on a non-paved road in a mine and the like for mining and quarrying, in addition to the effects mentioned above, it is possible to set an alarm and a speed limit based on the past, the present and a forecast of the future. Accordingly, the safety of the brake and the productivity of mining and quarrying can be secured.

In accordance with a second aspect of the present invention, there is provided a brake diagnosis apparatus for a self-propelled vehicle as stated in the first aspect, wherein the first matrix A has a predetermined area section which is identifiable separately from the other sections. As mentioned above, since a judgment as to whether or not the heat balance is good is not performed after outputting the first matrix A, but is previously stored with the first matrix A, they can be recognized at the same time of outputting the first matrix A.

Further, in accordance with a third aspect of the present invention, there is provided a brake diagnosis apparatus for a self-propelled vehicle having a friction plate type hydraulic brake wherein a movable friction plate attaches to and detaches from a fixed friction plate responsive to an oil pressure so as to obtain a brake force, comprising:

oil pressure detecting means, for detecting an oil pressure P;

speed detecting means, for detecting a value corresponding to a rotational speed V of the movable friction plate; and a second adding means, having stored therein a second matrix B which is sectioned in vertical and horizontal directions at every predetermined oil pressure area and at every predetermined rotational speed area, for receiving the oil pressure P from the oil pressure detecting means, for receiving the rotational speed V from the speed detecting means, for adding a frequency of occurrence value Bn to the section of the second matrix B which includes the detected oil pressure P and the detected rotational speed V, and for freely outputting the added frequency of occurrence value to an outer portion.

Accordingly, since the detection of the brake data is not performed in a pin point manner at each point in time in accordance with the conventional art, but is performed on the basis of the frequency Bn, the applicable range of the brake data can be widened. Accordingly, a multiplied value (=P·V) between a vertical value (an oil pressure) and a horizontal value (a rotational speed) in the second matrix B is in proportion to the heat generation of the brake, that is, the abrasion of the friction brake, particularly a disc. The multiplied value is ascertained with regard to the position of each of the sections in the second matrix. Accordingly, when the frequency of occurrence Bn is concentrated in a section having a great P V value, it indicates that the heat generation of the brake, that is, the abrasion of the friction brake, is frequent. As a result, in the same manner as with the first aspect of the present invention, various kinds of countermeasures can be taken, e.g., a clogging of the radiator can be eliminated, a shroud can be provided in the radiator, a capacity of an oil cooler and the radiator can be increased, a cooling oil amount can be increased, an incline of a downward slope can be changed, a transmission level of a transmission used in the downward slope can be decreased, a driving habit of an operator can be improved, and the like. Further, it is possible to prepare a friction plate for replacement, and to make a maintenance plan.

In accordance with a fourth aspect of the present invention, there is provided a brake diagnosis apparatus for a self-propelled vehicle as stated in the third aspect, wherein the second matrix B has a predetermined area section which is identifiable separately from the other sections. Accordingly, since a judgment of the abrasion amount in the friction brake and the like is not performed after outputting the second matrix B, but is previously stored with the second matrix B, they can be ascertained at the same time of outputting the second matrix B.

BEST MODE FOR CARRYING OUT THE INVENTION

Figure 1:
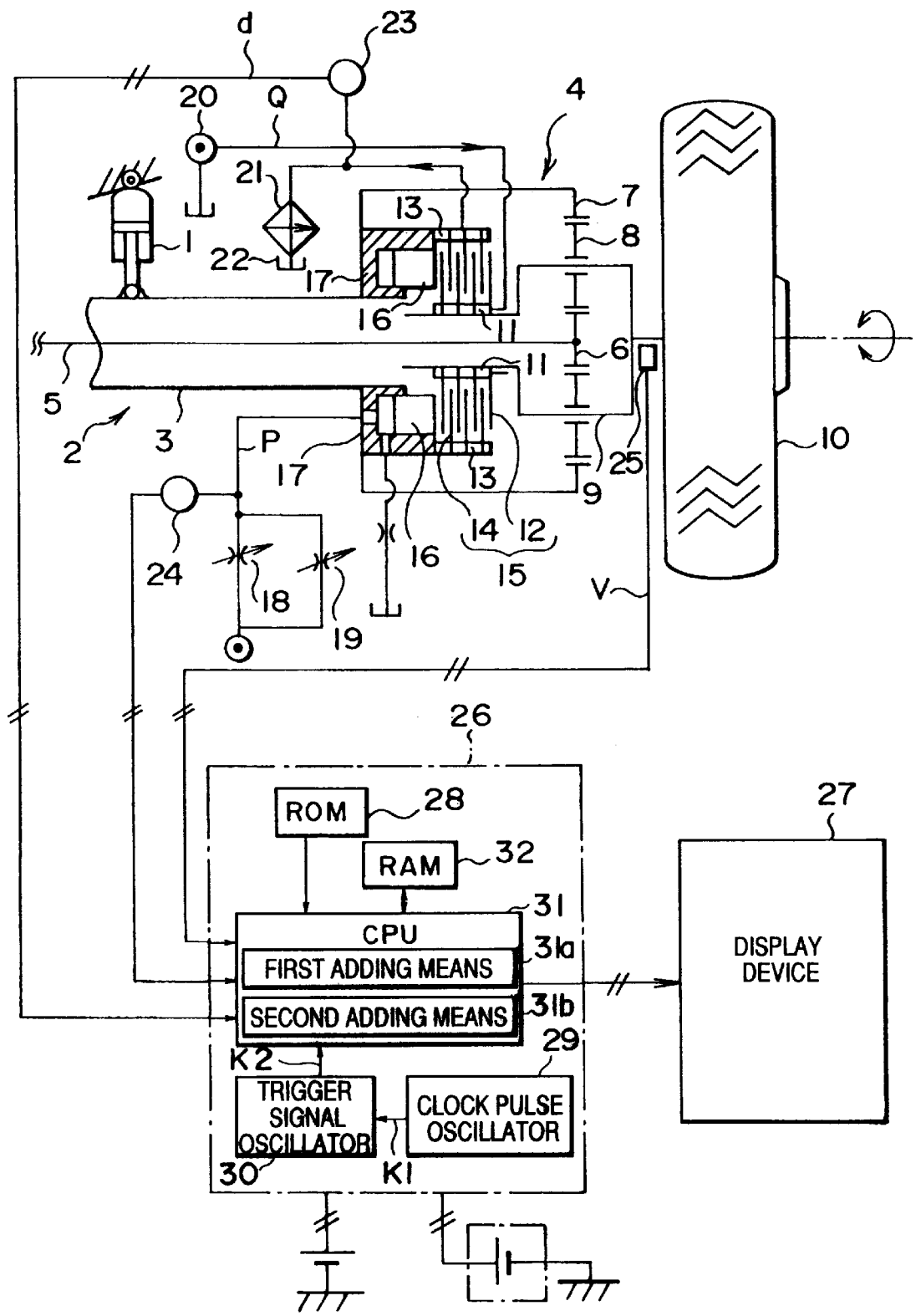
FIG. 1 is a control block diagram of a brake diagnosis apparatus for a self-propelled vehicle in accordance with an embodiment of the present invention.

A brake diagnosis apparatus for a self-propelled vehicle in accordance with an embodiment of the present invention will be described in detail with reference to FIGS. 1 and 2.

A self-propelled vehicle of this embodiment is a large-sized dump truck for a mine (hereinafter, referred to as a dump truck), and in FIG. 1, a right side portion of a full-floating axle 2, suspended by a suspension cylinder 1, is shown.

An axle housing 3 contains a drive shaft 5 therewithin; the left end of the drive shaft 5 is engaged with a differential gear (not shown), and the right end thereof is engaged with the sun gear 6 of the planetary gear apparatus 4, corresponding to a final reduction gear. The rotation of the drive shaft 5 freely rotates the carrier 9 via the planetary gear 8, which is provided between the sun gear 6 and the ring gear 7, which is fixed to and provided on an inner peripheral surface of the right end of the axle housing 3. For example, a rear wheel 10 is fixed to and provided at the right end of the carrier 9. The dump truck travels forwardly and backwardly in accordance which a rotational force from the differential gear which rotates the rear wheel 10 via the drive shaft 5, the sun gear 6, and the carrier 9.

The carrier 9 is provided with a spline 11, which extends in a lateral horizontal direction on an outer periphery close to a center of the vehicle body; and the inner teeth of a plurality of discs 12 (movable friction plates) are meshed with the spline 11. On the other hand, the axle housing 3 is provided with a spline 13, which extends in a lateral horizontal direction on an inner periphery close to the center of the vehicle body; and the outer teeth of a plurality of plates 14 (fixed frictional plates) are meshed with the spline 13 so as to alternately place them with respect to the discs 12 (hereinafter, a combination of the discs 12 and the plates 14 will be referred to as a friction brake 15). Further, an annular cylindrical 17 member, inwardly fitting annular piston 16 which is freely brought into contact with the left side surface of the plate 14 closest to the center of the vehicle body, is provided in the axle housing 3.

The dump truck is provided with a rotation type hand lever 18, which is provided near a steering wheel adjacent to a driver's seat in such a manner as to freely fix a rotation angle, and a foot pedal 19, which is provided on the floor adjacent to the driver's seat in such a manner as to be freely depressed. In the case of the rotation type hand lever 18, the operator stops the vehicle by rotating the lever 18 a predetermined angle; and in the case of the foot pedal 19, the operator stops the vehicle by depressing the foot pedal 19 a predetermined amount. Accordingly, an oil pressure P, having a value corresponding to the rotation angle or the depressing amount, is generated; the pressurized oil, having the pressure P flows into the annular cylinder 17 so as to move the annular piston 16 rightwardly, and a pressing force (a brake force) corresponding to the oil pressure P is generated in the friction brake 15. That is, the dump truck corresponds to "a self-propelled vehicle having a friction plate type hydraulic brake 15 wherein the movable friction plate 12 engages with or disengages from the fixed friction plate 14 due to the oil pressure P so as to obtain a brake force".

In the structure mentioned above, when the brake is operated, the brake force becomes frictional heat in the friction brake 15. In order to radiate the frictional heat, a cooling oil Q is supplied to the friction brake 15. That is, the cooling oil Q flows from a cooling hydraulic pump 20 into an inlet provided in the axle housing 3, and is injected into the friction brake 15, via an injection port which is provided in the spline 11 of the carrier 9, to cool the friction brake 15. The cooling oil Q, now having a higher temperature, flows from an outlet provided in the spline 13 of the axle housing 3 to an oil cooler 21, which is disposed in an outer portion, is cooled therein and then is stored in a tank 22. The cooling oil Q within the tank 22 is again supplied to the friction brake 15 by the cooling hydraulic pump 20.

Further, in the case wherein the dump truck continuously brakes in a continuous down slope, it is necessary to rotate the cooling hydraulic pump 20 at a high speed to supply a large amount of cooling oil Q to the friction brake 15. Accordingly, the operator pulls the rotation type hand lever 18 (a retard lever), and sets the rotational speed of the transmission to a higher level when entering a certain position, thereby always using the engine at a high rotational speed. That is, the dump truck also corresponds to "a self-propelled vehicle having an oil cooled type brake".

The dump truck is provided with an oil temperature sensor 23 (oil temperature detecting means), in the middle of the oil passage of the cooling oil Q flowing out from the friction brake 15, for detecting the temperature d of the cooling oil immediately after being used for cooling the brake. Further, an oil pressure sensor 24 (oil pressure detecting means) is provided in the oil passage from the rotation type hand lever 18 and the foot pedal 19 to the annular cylinder 17. Still further, a rotational speed sensor 25 (speed detecting means for detecting a value corresponding to the rotational speed of the discs 12), for detecting the rotational speed V of the rear wheel 10, is provided between the carrier 9 and the rear wheel 10. In this case, the rotational speed sensor 25 can be a vehicle speed sensor for detecting the vehicle speed v and can be provided in the vehicle body.

The oil temperature sensor 23, the oil pressure sensor 24, and the rotational speed sensor 25 are connected to a controller 26, and each of the cooling oil temperature d, detected by the oil temperature sensor 23, the oil pressure P, detected by the oil pressure sensor 24, and the rotational speed V, detected by the rotational speed sensor 25, is inputted to the controller 26.

Figure 2:
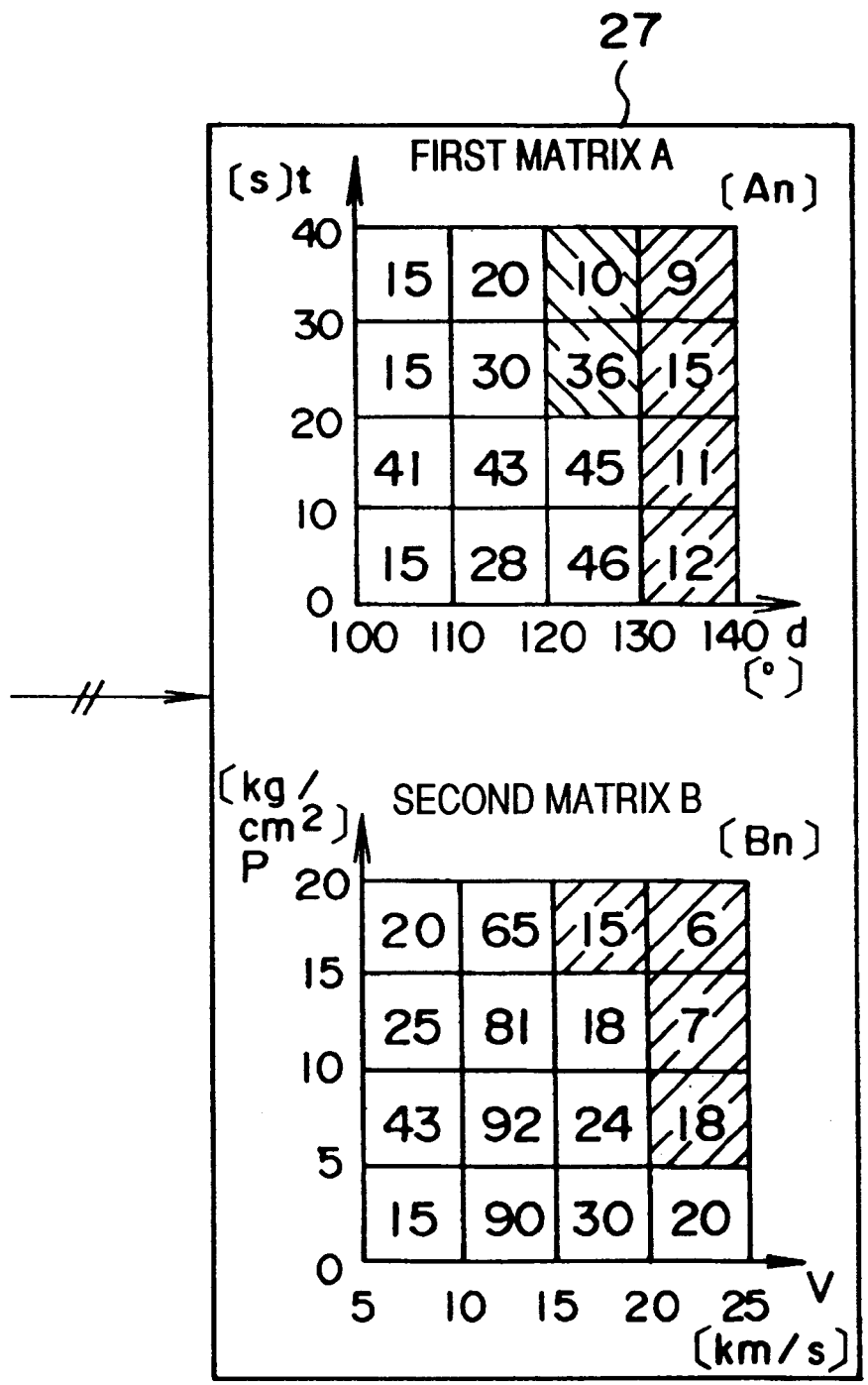
FIG. 2 is a schematic view of first and second matrixes displayed on the display device in FIG. 1.

The controller 26 has stored in a ROM 28 a first matrix A, which is sectioned in vertical and horizontal directions at every predetermined cooling oil temperature area and at every predetermined holding time area, and a second matrix B, which is sectioned in vertical and horizontal directions at every predetermined oil pressure area and at every predetermined rotational speed area, as shown in FIG. 2. Further, the controller 26 includes a clock pulse oscillator 29, for oscillating a clock pulse K1 at every predetermined time $t_0$ (for example, $t_0=1$ minute); a trigger signal oscillator 30, for receiving the clock pulse K1 from the clock pulse oscillator 29 and for oscillating a trigger signal K2 on the basis of at least one of the signals at a time of initiating the clock pulse K1 and at a time of terminating the clock pulse K1; a calculating portion 31 (CPU); and a RAM 32.

The calculating portion 31 stores any one or both of the following two programs in the RAM 32, and performs the following processes on the basis of the programs.

The first program is as follows. When the cooling oil temperature d (=d1), which is detected by the oil temperature sensor 23, is inputted, first adding means 31a within the calculating portion 31 initially selects a cooling oil temperature area, which includes the cooling oil temperature d1, from among the first matrix A. At the same time, it starts counting the trigger signal K2 from the trigger signal oscillator 30 (that is, addition is performed). The addition is continuously performed until the successively inputted cooling oil temperature d becomes the cooling oil temperature d (=d2) which is included in another cooling oil temperature area. When the cooling oil temperature becomes d2, the first adding means 31a selects a holding time area, which includes the holding time t (=n·$t_0$), at the cooling oil temperature d1 from among the first matrix A, and stores the frequency of occurrence An (=1) in that holding time area in the RAM 32. With respect to the cooling oil temperature d2, the same operation as that of the cooling oil temperature d1 is repeated, so that the contents of the first matrix A within the RAM 32 is renewed.

Thereafter, when the cooling oil temperature area which includes the detected cooling oil temperature d (=d1) is the same as the cooling oil temperature area mentioned above, and the holding time area which includes the holding time t (=n·$t_0$) is the same as the holding time area mentioned above, the frequency of occurrence An (=1) is further added to the frequency of occurrence An (=1) for storage as mentioned above so as to obtain a frequency of occurrence An (=2), whereby the contents of the first matrix A within the RAM 32 are renewed. Thereafter, the renewal operation mentioned above is repeated.

In this case, the holding time calculating means is constituted by including the clock pulse oscillator 29, the trigger signal oscillator 30, and the calculating portion 31. Further, the cooling oil temperature d1, which is inputted to the first adding means 31a, can be a value such that the cooling oil temperature d, as detected by the oil temperature sensor 23, passes through the holding time calculating means. This is because in the holding time calculating means, the cooling oil temperature d1 is inputted by setting the input time of the first cooling oil temperature d or the changing time of a subsequent cooling oil temperature d (a changing point between the areas) to be a calculation starting time for the calculation of the holding time.

The second program is as follows. A second adding means 31b within the calculating portion 31 receives the oil pressure P from the oil pressure sensor 24 and the rotational speed V from the rotational speed sensor 25, and selects the oil pressure area which includes the oil pressure P from the second matrix B. Next, it selects the rotational speed area which includes the rotational speed V among the selected oil pressure area from the second matrix B, and stores the frequency of occurrence Bn (=1) in that rotational speed area in the RAM 32.

This procedure can be structured so as to initially select the rotating speed area, which includes the rotating speed V from the second matrix B, and then select the oil pressure area which includes the oil pressure P among the selected rotating speed area from the second matrix B, and to store the frequency of occurrence value Bn (=1) in that oil pressure area in the RAM 32. Since thereafter the procedures are the same as those of the first program, an explanation thereof will be omitted.

In accordance with the first and second programs, as the dump truck is operated, the frequency of occurrence values An and Bn are respectively added to the vertical and horizontal sections in the first matrix A and the second matrix B so as to be stored in the RAM 32. Each of the frequency of occurrence values An and Bn expresses a history, for example, expresses a tendency of a travel road condition such as an unevenness, a curve, a down slope, a crossing, a railroad crossing, and the like, or a habit of the operator, a vehicle condition, and the like.

The first adding means 31a and the second adding means 31b within the calculating portion 31 can display the first matrix A and the second matrix B stored in the RAM 32 as well as each of the frequency of occurrence values An and Bn at a predetermined interval or continuously on a display device 27. Further, the structure can be made such that a command sending button (not shown) to the calculating portion 31 is independently provided, and the matrixes A and B are suitably displayed on the display device 27 in accordance with the operator pushing the command sending button. Still further, the structure can be made such that the matrixes A and B are copied to a magnetic card or the like, thereby permitting them to be displayed on a display device (not shown) provided within a building. In addition, in the case wherein a microcomputer which is provided in the dump truck or within the building, has a program which is different from the program mentioned above and the other data, the display can include the other data and the like.

Here, it is desirable that the first matrix A and the second matrix B identify a particularly significant area section from among the other sections, as shown in an oblique line area in FIG. 2. The details are as follows.

For example, in the case wherein the frequency An is frequently generated in the rightwardly descending oblique line areas (the areas having a high temperature and a long time period) shown in the first matrix A, the particularly significant area (the oblique line area) in the first matrix A indicates a problem with the heat balance of the entire vehicle. In this case, various kinds of countermeasures can be taken, e.g. a clogging of the radiator can be eliminated, a shroud can be provided in the radiator, a capacity of an oil cooler and the radiator can be increased, a cooling oil amount can be increased, an incline of a downward slope can be changed, a transmission level of a transmission used in the downward slope can be decreased, a driving habit of an operator can be improved, and the like.

Further, for example, in the case that the frequency of occurrence An is frequently generated in the rightwardly ascending oblique line areas (the areas having a super high temperature) shown in the first matrix A, the particularly significant area indicates a trouble in a cooling system. In this case, it is planned that the cooling system be immediately repaired or a period for repair be hastened.

On the other hand, the particularly significant area (the oblique line area) in the second matrix B indicates the following matter. A multiplied value (=P·V) between a vertical value (the oil pressure P) and a horizontal value (the rotating speed V) in the second matrix B is in proportion to the heat generation of the brake, that is, the friction brake, particularly an abrasion of a disc. In this case, strictly, it should be "substantially in proportion" since a coefficient of friction of the friction brake is changed in accordance with its temperature; however, in this case, it can be considered to be "in proportion". Then, the multiplied value need not be realized by an actual multiplication, but can be realized by the position of each of the sections in the second matrix B. For example, in the case that the frequency Bn is frequently generated in the rightwardly ascending oblique line areas (the areas having a high temperature and a high speed rotation) shown in the second matrix B, the particularly significant area indicates that there is a lot of heat generation in the brake, that is, abrasion of the friction brake, particularly the disc.

As a result, in the same manner as with the particularly significant area in the first matrix A, for example, various kinds of countermeasures can be taken, e.g., a clogging of the radiator can be eliminated, a shroud can be provided in the radiator, a capacity of an oil cooler and the radiator can be increased, a cooling oil amount can be increased, an incline of a downward slope can be changed, a transmission level of a transmission used in the downward slope can be decreased, a driving habit of an operator can be improved, and the like. Further, a friction brake for replacement can be prepared, and a repair plan can be made.

In accordance with this embodiment, since the detection of the brake data is not performed at each position in a pin point manner as in the conventional art, but is performed on the basis of each of the frequency of occurrence values An and Bn showing the history, the range of applying the brake data is widened. Further, even in the self-propelled vehicle traveling on the non-paved road in the mine or the like for mining and quarrying, it is possible to set an alarm and a speed limit based on the past, the present, and a forecast of the future. That is, as well as a safety of the brake, a productivity of mining and quarrying can be secured.

Here, in this embodiment, in order to detect the cooling oil temperature d, the oil temperature sensor 23, for detecting the cooling oil temperature d immediately after the oil cools the brake, is provided in the middle of the passage of the cooling oil Q flowing out from the friction brake 15; however, the structure can be made such that another oil temperature sensor (not shown), for detecting the cooling oil temperature immediately before the cooling oil enters the brake, is provided in the middle of the passage of the cooling oil Q flowing into the friction brake 15, so that the temperature difference between the oil temperature before cooling the brake and the oil temperature after cooling the brake is detected; the temperature difference can be deemed to be "a cooling oil temperature d" and the first program can be performed. In this case, the changing history of the brake temperature can be accurately recognized; however, a history of the heat balance of the entire vehicle can not be recognized. Accordingly, in order to know the history of the heat balance, it is sufficient to calculate on the basis of the cooling oil temperature d only from the oil temperature sensor 23 and to display the result.

INDUSTRIAL APPLICABILITY

The present invention is useful for a brake diagnosis apparatus for a self-propelled vehicle, such as a dump truck and the like, which can secure safety of the brake and the productivity of mining and quarrying, and which can detect widely applicable data including the history.

What is claimed is:

1. A brake diagnosis apparatus for a self-propelled vehicle having a hydraulic brake comprising:

oil temperature detecting means, for detecting a cooling oil temperature d immediately after the cooling oil is used to cool a brake; holding time calculating means, for receiving the cooling oil temperature d from the oil temperature detecting means and for calculating a holding time t of the cooling oil temperature d; and an adding means, having stored therein a matrix A, which is sectioned in vertical and horizontal directions at every predetermined cooling oil temperature area and at every predetermined holding time area, for receiving the cooling oil temperature d from any one of said oil temperature detecting means and said holding time calculating means, for receiving the holding time t from the holding time calculating means, for adding a frequency of occurrence value An to the area of the matrix A which includes the cooling oil temperature d and the holding time t at each time, and for freely outputting the added value to an outer portion.

2. A brake diagnosis apparatus for a self-propelled vehicle as claimed in claim 1, wherein the matrix A has a predetermined area section which is identifiable separately from the other sections.

3. A brake diagnosis apparatus for a self-propelled vehicle having a friction plate hydraulic brake wherein a movable friction plate attaches to and detaches from a fixing friction plate responsive to an oil pressure so as to obtain a brake force, said brake diagnosis apparatus comprising:

oil pressure detecting means, for detecting an oil pressure P;

speed detecting means, for detecting a value corresponding to a rotational speed V of the movable friction plate; and adding means, having stored therein a matrix B, which is sectioned in vertical and horizontal directions at every predetermined oil pressure area and at every predetermined rotational speed area, for receiving the oil pressure P from said oil pressure detecting means, for receiving the rotational speed V from said speed detecting means, for adding a frequency Bn to the section of the matrix B which includes the detected oil pressure P and the detected rotational speed V, and for freely outputting the added value to an outer portion.

4. A brake diagnosis apparatus for a self-propelled vehicle as claimed in claim 3, wherein the matrix B has a predetermined area section which is identifiable separately from the other sections.

* * * * *